Nov. 2, 1926.
W. THOMAS
1,605,014
READING INDICATOR FOR MANOMETERS
Filed May 31, 1921
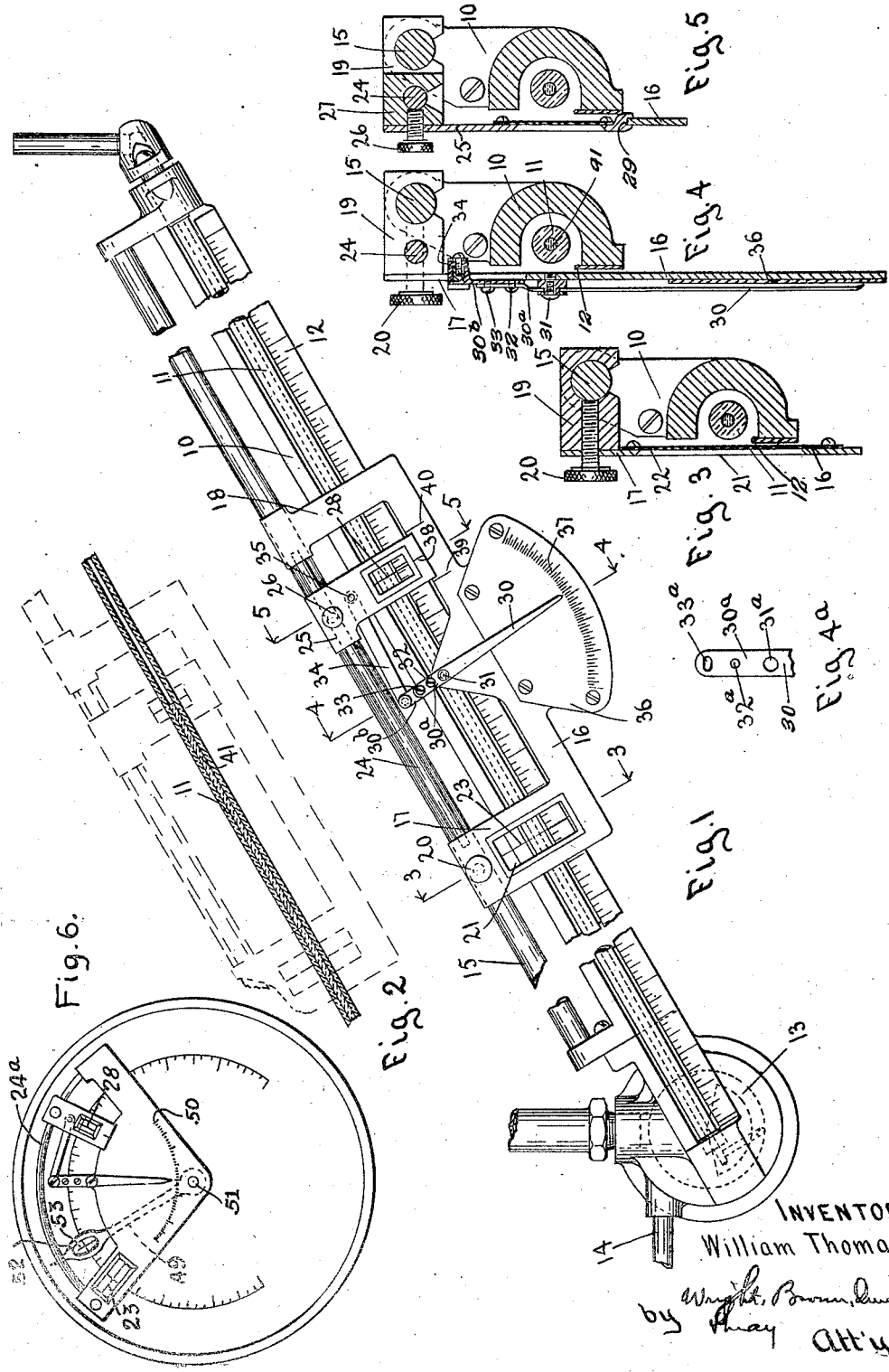
INVENTOR
William Thomas Patented Nov. 2, 1926.

1,605,014

UNITED STATES PATENT OFFICE.

WILLIAM THOMAS, OF WEST NEW YORK, NEW JERSEY, ASSIGNOR TO PNEUMERCATOR COMPANY, OF NEW YORK, N. Y., A CORPORATION OF MAINE.

READING INDICATOR FOR MANOMETERS.

Application filed May 31, 1921. Serial No. 473,619.

The subject of this invention is a device which, in one of its forms, is adapted to be used in connection with a manometer of the column type, and in another form with manometers of the types having mechanically actuated pointers, for accomplishing one or more of the following results:

(1) Reading the height of the indicating column with a high degree of precision.

(2) Reading fluctuations in the indications of the manometer with an enlargement at the reading point of such fluctuations.

(3) Reading specific gravities or values dependent upon specific gravity in connection with any manometer upon an enlarged scale.

The nature of the invention, its capacity for serving the above noted purposes, and the manner in which it is used to accomplish said purposes may best be understood by an explanation of specific instruments variously embodying the invention, for which purpose attention is directed to the following specification and to the drawings forming a part thereof.

In the drawings,—

Figure 1 is an elevation of a column manometer showing my reading indicator connected therewith.

Figure 2 is a diagrammatic elevation showing the manometer tube in section and a part of the reading indicator in broken lines to illustrate the mode of use thereof.

Figures 3, 4 and 5 are cross sections of the indicator in combination with the manometer taken on lines 3—3, 4—4, and 5—5, respectively, of Figure 1.

Figure 4$^a$ is a fragmentary elevation of a part of the pointer.

Figure 6 is a front elevation of a modified form of my indicator designed for use with a manometer or gauge of the mechanical type having a swinging hand.

In Figure 1 the numeral 10 represents the frame of the manometer supporting a tube 11 and a scale 12 beside the tube. Said tube is adapted to contain an indicating liquid, and is connected at its lower end with a chamber 13 in which a supply of the liquid is contained, and to which is connected a pipe 14 for conducting air or other medium under pressure into the chamber, so as to apply pressure to the fluid therein and force a column of the fluid up into the indicating tube. The liquid column in the manometer tube may be mercury or any other suitable liquid, but since mercury is the liquid most commonly used in such apparatus, I will assume for the purposes of this description that the liquid here is mercury, although without intending thereby to imply any limitation of the scope in which I claim protection for my invention. Although the manometer is shown in Figure 1 as being located at an inclination, such showing is not intended as a limitation, but the manometer is to be considered as typical of any column manometer whether inclined or vertical. And, indeed in Figure 6 the use of my invention with a vertical manometer is shown.

Connected with the manometer frame, beside the indicating tube thereof, is a guide rod 15, and on this guide rod is mounted a reading indicator, in which the invention particularly resides, in such manner that said indicator may be shifted bodily lengthwise of the manometer and set at any desired position. 16 represents the frame or mounting structure of my indicator; and herein the word "frame" is used with a broad significance to indicate any structure, however formed, upon which may be mounted the other parts of the indicator arranged and operating substantially as required by the following claims. This frame (in the form now being described) includes arms 17 and 18 to which are connected blocks 19 having guideways through which the rod 15 extends, said blocks being adapted to slide on the rod. In the arm 17 and the block connected therewith is mounted a set-screw 20 threaded into a tapped hole therein and adapted to bear on the rod 15 so as to clamp the indicator in any of its positions.

In the arm 17 is an opening or window 21 across which is secured a transparent sheet or pane 22 bearing a hairline 23. Said arm is so disposed that the hairline crosses both the indicating tube and the scale 12 and is adapted to be put in register either with the meniscus at the head of the liquid column or with any of the graduations of the scale. Preferably, also, the location of the hairline is as close as possible to the scale and to the tube in order to avoid errors of reading due to parallax.

The hairline may be scratched on a transparent sheet of celluloid or other suitable material, as here indicated, or it may be a filament or wire scratched across an open space in a known manner, and it typifies any sort of sighting point or sighting element which may be provided upon the frame to coact with the indicating column or the scale of the manometer. Such sighting point may also be provided by one of the edges of the arm 17 or by some other point upon said arm or other part of the frame to the same purpose and with the same effect so far as the principles of the invention which I claim herein are concerned.

The blocks 19 (which are, in effect, parts of the arms 17 and 18) support a second guide rod 24 and on said second guide rod is mounted a traveller 25 which is adapted to slide under the guidance of the rod lengthwise of the manometer relatively to the frame. A set-screw 26 threaded into the traveller 25 serves to clamp the same in any desired position on the guide rod 24. This traveller is preferably made in part as a block 27 which slides upon the rod 24, and in part as a plate which projects over the indicating tube and the scale 12 and is provided with a window and a sighting mark 28, substantially like or equivalent to the sighting mark 23 and to all equivalents of the latter. The end of the traveller opposite to the block portion thereof is preferably provided with a guideway 29, as shown in Figure 5, which embraces the adjacent edge of the frame and is retained and guided thereby in near proximity to the scale and tube of the manometer.

An index or pointer 30 is mounted on the frame by a pivot 31 and said index is, in effect, a lever having arms of unequal lengths. Its short arm is composed of two parts, namely, an extension 30$^a$ integral with the long arm and a piece 30$^b$ which is adjustably connected to the extension 30$^a$ by means of a pivot 32 and a clamp screw 33. In Figure 4$^a$, the holes in the pointer which receive pivots 31 and 32 are designated 31$^a$ and 32$^a$, respectively. The clamp screw 33 passes through a slot 33$^a$ in the extension 30$^a$ which is somewhat wider than the shank of the screw, whereby an angular adjustment of the parts 30$^a$ and 30$^b$ is permitted. The latter part is pivoted to a link 34 which is joined to the traveller by a pivot 35.

A scale plate 36 is secured to the frame adjacent to the index, and is provided with graduations 37 in a line close to the path wherein the index swings. These graduations may be laid out for different uses to indicate specifically different values, such as linear heights, or depths, in feet and inches, or other units of measure, or volume or weight in any units, or specific gravity based upon unity or upon any conventional or arbitrary scale such as the Baumé scale.

It is within my contemplation to provide the same scale plate with two or more scales of these various characteristics, in order that the same instrument may be adapted to read depths or heights measured by the manometer, and volumes or weights of liquids which correspond to such indications, or both depths in and specific gravities of liquids, or any two or more of the values indicated and / or related values. Hence in showing the scale 37 without characteristic numbers or other symbols I have intended to indicate that such scale typifies any scale of any character, or a plurality of such scales, without other limitation than is required by the appended claims.

The provision for adjustment between the two parts which form the short arm of the index enables such index to be set correctly with respect to the scale and to the range of movement of the traveller. For convenience of such setting the traveller is provided with a mark 38 which is adapted to register with marks 39 and 40 on the frame at the extreme limits of the indicated range of movement of said traveller, and the adjustment of the index is made to bring its extremity into register with one or the other extreme graduation of the scale 37 when the traveller is placed to register its mark 38 with one or the other of the marks 39 and 40.

One use of the indicator is to read with extreme accuracy the height of the indicating column to fractional subdivisions of the graduations on the scale 12. Such use is indicated in Figures 1 and 2 in this wise:—

Assuming that the movement of the traveller, which is measured by the index 30 and scale 37, is fully as great as the distance between unit graduations of the scale 12, and that the scale 37 indicates fractions of the intervals between such unit graduations, then, in order to take an exact reading of the manometer, the traveller is first shifted with respect to the frame until the index 30 is brought beside the zero or beginning point of the scale 37. In the present instrument the zero point is at the right hand end of scale 37. There the traveller is held fast conveniently by setting up the screw 26, and the whole indicator, including the frame 16, is shifted along the manometer until the sighting mark 28 registers as accurately as possible with the nearest unit graduation of the scale 12 below the head of the indicating column, and the frame is made fast in this position by the screw 20. Then the traveller is loosened and shifted until its sighting mark becomes tangent to the meniscus at the head of the indicating column. This movement causes an enlarged reading, by means of the index and scale 37, of the fraction of the unit space on the scale 12 between the graduation over which the sighting line is placed and the end of the column. In this way an accurate reading of the position of the column is taken in terms of units and fractions of the unit of the scale 12. Figure 2 shows the indicating column at 41, and indicates in dotted lines the relation of the traveller with its sighting mark in register with the end of the column. It makes no difference what the particular units of this scale may be or how far apart or near together such units are, provided only the traveller is capable of moving at least as far as the distance between two such graduations and the scale 37 is laid off in terms of fractions of the unit.

Accuracy of reading commensurate with the multiplication by the index 30 is possible because a sighting mark, such as the line 28, can be put in register with a graduation of the scale and with the head of the liquid column, with much greater accuracy than a sight can be taken by the unaided eye from the head of an indicating column to a graduation mark beside it, and more accurately also than the fractional parts into which the space between marks on the scale is divided by a sighting mark, can be estimated.

If the manometer is used to measure the pneumatic pressure balancing a head of liquid above a submerged point in a tank of known dimensions, the reading taken may be in terms of linear depth of the submerged point below the surface of the liquid, or of the volume or weight of the liquid, in any units. For that use, the scales 12 and 37 are graduated in terms of the particular value which the specific instrument applied thereto is designed to indicate.

This indicator may also be used for the purpose of reading specific gravities in connection with means for creating fluid pressures equivalent to the heads of liquid at different levels in a tank containing liquid, when the difference between such levels is known, as explained in the Patent No. 1,457,406, dated June 5, 1923, of C. W. Stancliffe.

Figure 6 shows a modification of the reading indicator adapted for manometers of the mechanical type, such as the well known pressure gages, wherein the distortion of a Bourdon tube, or a diaphragm, or a series of diaphragms is transmitted by mechanical movement to a reading indicating hand. Such a hand is represented at 49, being there shown illustratively and without reference to any particular indicating position. The manometer may be equipped with a dial of the ordinary sort graduated to read in terms of the values desired to be indicated in any particular case. The reading indicator for use in this combination differs from that first described in that it is mounted to swing about the center whereon the hand 49 swings, and that its traveller must move about the same axis.

The frame 50 of the reading indicator, therefore, is appropriately constructed and shaped to enable it to swing about the center 51, and the bar 24$^a$ and the edge of the frame, which together guide the traveller, are appropriately curved. In all other respects the traveller, sighting marks and multiplying index are essentially the same as already described. In order to make possible an exact registration of the sighting marks of the reading indicator with the hand 49, the latter is conveniently formed with a window 52 and a sighting line 53 extending across the window, and made in any of the ways indicated for the sighting marks 23 and 28. This modified reading indicator is adapted to determine specific gravities or related values in connection with the hand of a mechanical gage in the same way as already described in connection with the column type of manometer.

Other modifications may be made in the construction, form and arrangement of the reading indicator, and in its mode of combination and use with the manometer, all within the scope and spirit of my invention as set forth in the claims.

I will state in this connection with reference to the index 30 and scale 37 that although the relatively movable member of this couple is an index having a single point and the relatively stationary member is a scale having a series of graduations, a reversal of this arrangement, wherein the movable element embodies a series of graduations or points and the relatively stationary element is a single point, is the equivalent of the arrangement shown and is within the protection of my claims directed to that arrangement.

What I claim and desire to secure by Letters Patent is:

1. The combination, with a manometer having a tube to contain a liquid indicating column and a scale beside said tube, of a reading indicator comprising a frame mounted adjacent to said manometer with provisions for adjustment longitudinally of said tube and having a sighting point adapted to be placed in register with one of the graduations of said scale or with the head of the liquid column, a traveller mounted on said frame and movable longitudinally of said tube and having a sighting point adapted to be placed in register with the head of said column, an index and means connecting said index with said traveller and operable thereby to indicate on an enlarged scale the movement thereof relatively to the frame.

2. The combination with a manometer having an indicating element, of a reading indicator having a frame arranged to be mounted adjacent to the manometer and to be adjusted in the directions of movement of said element, and having a sighting point arranged to be placed over and in register with said element, a traveller mounted on said frame and being adjustable thereon in the same direction as the frame and an index coupled to said traveller and constructed to indicate to an enlarged scale the adjustments of the traveller relatively to the frame.

3. A reading indicator for manometers comprising a frame having a guide member, a traveller mounted adjustably on said guide member, said traveller and the frame having respective sighting points adapted to be separately placed in register with different positions of the indicating element of a manometer, a multiplying index mounted on the frame and coupled to the traveller so as to be moved by and with the latter and a scale mounted on the frame in cooperative relation to said index.

4. A reading indicator for manometers comprising a frame having a sighting point and including a guide member, a scale fixed upon said frame, an index having a long arm and a short arm pivoted to said frame in a manner such that the long arm moves in conjunction with said scale, a traveller mounted to be adjustable along said guide member and having a sighting point, and means connecting said traveller to the short arm of said index to apply movement thereto, each of said sighting points being adapted for independent placement in conjunction with the indicating element of a manometer.

5. A column manometer having a longitudinal scale of graduations and having a guide, a reading indicator mounted on said guide and being adjustable lengthwise of the manometer, a traveller forming part of the indicator mounted with provisions for adjustment lengthwise of the manometer independently of the balance of the indicator and having a sighting mark adapted to be placed in register with a graduation of said scale and with the end of the manometer column in turn, an index, means connecting said index with said traveller, and a scale arranged as part of said indicator to cooperate with said index, said last-named scale and index being constructed to multiply movements of the traveller.

6. In combination with a manometer of the column type having a longitudinal scale, a reading indicator comprising a traveller having a sighting mark adapted to be placed in register with selected graduations of said scale and with the head of the indicating column of the manometer in turn, an index carried by said indicator and coupled to said traveller to be moved by and with the latter and having a multiplying arm, and a scale complemental to said arm also carried by said indicator and adapted to be adjusted by the operator with said traveller and to be set in stationary position relatively thereto, said last-named scale being established in terms of subdivisions of the first-named scale.

7. In combination with a column manometer and a scale beside the same, a reading indicator mounted adjacent to said manometer with provision for adjustment longitudinally thereof and comprising a frame, a sighting element relatively movable on said frame in the direction of movement thereof, a multiplying index coupled to said sighting element and to the frame so as to be moved in consequence of such relative movement, and a scale connected to the frame and arranged in conjunction with said index; said sighting element being arranged with capability of being put in register with a graduation of the first scale and with the head of the indicating column in turn, and the second scale being established to show values dependent on the distance between different positions of the sighting element in terms of the units, and fractions thereof, of the first scale.

8. A reading indicator comprising a frame, a traveller mounted movably upon said frame and having a sighting mark, an index couple comprising complemental index and scale members, one member of which is stationary upon the frame and the other member is pivoted to the frame in such manner as to cooperate with the stationary member, said pivoted member having an arm, means connecting said arm to said member in a manner permitting angular adjustment relatively thereto, and a link connecting said arm with said traveller.

In testimony whereof I have affixed my signature.

WILLIAM THOMAS.